(12) United States Patent
Rosén et al.

(10) Patent No.: US 7,798,012 B2
(45) Date of Patent: Sep. 21, 2010

(54) DEVICE, METHOD AND MEASUREMENT AND SENDER UNIT FOR PERFORMING A MEASUREMENT ON A ROTATING PART OF ROTATING MACHINERY

(75) Inventors: Mikael Rosén, Finspang (SE); Roy Toennesen, Norrkoping (SE)

(73) Assignee: ALSTOM Technology Ltd., Baden (CH)

( * ) Notice: Subject to any disclaimer, the term of this patent is extended or adjusted under 35 U.S.C. 154(b) by 342 days.

(21) Appl. No.: 11/780,629

(22) Filed: Jul. 20, 2007

(65) Prior Publication Data

US 2007/0293152 A1 Dec. 20, 2007

Related U.S. Application Data

(63) Continuation of application No. PCT/EP2005/051710, filed on Apr. 19, 2005.

(30) Foreign Application Priority Data

Feb. 4, 2005 (EP) .................................. 05002365

(51) Int. Cl.
*G01B 7/16* (2006.01)
(52) U.S. Cl. .......................................... 73/781; 73/760
(58) Field of Classification Search ...............
73/862.331–862.333, 760–781
See application file for complete search history.

(56) References Cited

U.S. PATENT DOCUMENTS

| | | | |
|---|---|---|---|
| 4,148,013 A | | 4/1979 | Finn et al. |
| 4,836,616 A | * | 6/1989 | Roper et al. ............ 303/122.06 |
| 6,335,224 B1 | | 1/2002 | Peterson et al. |
| 6,434,512 B1 | * | 8/2002 | Discenzo .................... 702/184 |
| 7,256,505 B2 | * | 8/2007 | Arms et al. ................. 290/1 R |
| 7,584,668 B2 | * | 9/2009 | Ohta et al. .................... 73/777 |

FOREIGN PATENT DOCUMENTS

CN 1198016 A 11/1998

(Continued)

OTHER PUBLICATIONS

International Search Report for PCT Patent App. No. PCT/EP2005/051710 (Oct. 10, 2005).

(Continued)

*Primary Examiner*—Max Noori
(74) *Attorney, Agent, or Firm*—Cermak Nakajima LLP; Adam J. Cermak (57) ABSTRACT

A device and a method for performing a measurement on a rotating part (11) of rotating machinery includes a measurement device (1), which is mounted at the rotating part (11), for measuring at least one parameter of the rotating part (11), a sender (2) for receiving measuring data from the measurement means (1) and including at least one radio frequency module (22), particularly a Bluetooth® module, for the wireless transmission (8) of data based on the received measuring data, a receiver (5) including a radio frequency module, particularly a Bluetooth® module, for receiving the data transmitted from the sender (2), and a processing unit (4) connected to the receiver (5) and provided for processing measuring data contained in data received from the receiver (5). The device can be applied for particularly long term online monitoring of rotating machinery like steam turbines, gas turbines, or generators.

13 Claims, 7 Drawing Sheets

FOREIGN PATENT DOCUMENTS

| | | |
|---|---|---|
| CN | 2575684 Y | 9/2003 |
| GB | 2 321 969 | 8/1998 |
| GB | 2 395 532 | 5/2004 |
| WO | WO92/08962 | 5/1992 |
| WO | WO02/46701 | 6/2002 |
| WO | WO2006/081873 | 8/2006 |

OTHER PUBLICATIONS

International Preliminary Report on Patentability for PCT Patent App. No. PCT/EP2005/051710 (May 22, 2007).

* cited by examiner

DEVICE, METHOD AND MEASUREMENT AND SENDER UNIT FOR PERFORMING A MEASUREMENT ON A ROTATING PART OF ROTATING MACHINERY

This application is a Continuation of, and claims priority under 35 U.S.C. §120 of, PCT application number PCT/EP2005/051710, filed 19 Apr. 2005, and claims priority therethrough under 35 U.S.C. §119 to European application number 05002365.4, filed 4 Feb. 2005, the entireties of which are incorporated by reference herein.

BACKGROUND

1. Field of Endeavor

The invention relates to a device for performing a measurement on a rotating part of rotating machinery, and a corresponding method, as well as a measurement and sender unit for performing a measurement on a rotating part of rotating machinery.

2. Brief Description of the Related Art

Condition monitoring of rotating machinery, such as steam or gas turbines or generators, is usually carried out during overhauls of the machinery at slow rotating speeds. For monitoring, measurement systems are used, which are connected by cables with an outside processing unit for processing the measuring data. This method is time consuming and also inapplicable for online condition monitoring of the rotating machine. However, for long time reliability of rotating machinery, it may be essential to continuously monitor the condition of the machinery online in order to detect undesired forces which can reduce the lifetime of the machinery.

Continuous monitoring would be important in applications such as the one described in the following. In power plants, several rotating machines may be coupled together in order to form a shaft with a considerable length conveying the forces of the machines. The shaft sections of the machines are aligned and connected by means of shaft couplings. Bearings may be arranged between the couplings and at the end of the shaft for pivoting the shaft. Misalignment of the shaft sections can generate undesired forces which may cause vibrations, shaft bending, a reduced bearing and coupling life, and a reduced efficiency of the power plant.

WO 92/08962 discloses a method and a device for aligning shaft sections at a rotor shaft having several parts. The shaft sections are joined by means of couplings and the shaft is journal led in bearings on each side of the couplings. Strain gauges are fixed to each side of a coupling. Their measuring values indicate the strain at each shaft coupling. The bending moment in the shaft coupling is evaluated by a processing unit and then utilized in a moment minimization unit. Furthermore, a third unit can utilize indications of allowed angular deviations for each coupling in order to minimize the bearing movements which have to be made to minimize the total residual moment in the couplings.

Therefore, there exists a need to provide a device, method, and measurement and sender unit for performing a measurement on a rotating part of rotating machinery, which allow for particularly long term online monitoring.

SUMMARY

According to one of numerous aspects of the invention, measuring data from a rotating part of rotating machinery is transmitted over a wireless communication connection. Since no cables are required for the measurement, long term online monitoring of the rotating machinery is possible. A device embodying principles of the invention may measure one or more parameters of a rotating part and send the measurement data over the wireless communication connection to a processing unit for further processing. The device is suitable for application in rotating machinery, such as steam turbines, gas turbines, or generators, when harsh environments with high rotational forces, high temperatures, and electromagnetic interferences evolve. It may also be applicable for online short term as well as online long term measurements on both high-speed and low-speed rotating machinery.

According to an exemplary embodiment of the present invention, a device for performing a measurement on a rotating part of rotating machinery is provided which comprises measurement means mounted at the rotating part for measuring at least one parameter of the rotating part, sender means for receiving measuring data from the measurement means and comprising at least one radio frequency module, particularly a Bluetooth® module, for the wireless transmission of data based on the received measuring data, receiver means comprising a radio frequency module, particularly a Bluetooth® module, for receiving the data transmitted from the sender means, and a processing unit connected to the receiver means and provided for processing measuring data contained in data received from the receiver means.

Preferably, the sender means is also mounted at the rotating part. An exemplary radio frequency module includes a module which can communicate over a wireless transmission. Particularly, the usage of the Bluetooth® technology for the radio frequency module as a modern, low-cost, low power radio technology for cable replacement makes a cost-efficient implementation of this device possible. However, also other wireless technologies may be suitable according to the invention, such as IEEE 802.11 WLAN standard or HIPERLAN. However, the main advantages of Bluetooth® technology are the possibility of two-way-communication and robust wireless transmission, which can be assured because of the following characteristics: resending of missing data packages, usage of continuous frequency hopping between 79 channels with a data rate of about 1 Mbit/s in the 2.5 GHz frequency band to avoid interference from other radio sources, and no necessity of complicated antenna installation.

Preferably the receiver means are adapted to control a measurement by sending control data to the sender means. The sender means may process the received control data and control the measurement process, e.g., by programming the measurement means in accordance with the received control data. Also, the sender may transmit control data to the sender means in order to program the processing of measuring data. When Bluetooth® modules are used as radio frequency modules, the establishment of a two-way-communication between the Bluetooth® modules for transmitting the measuring data on one hand and for transmission of control data on the other hand makes it possible to develop a standardised and user friendly implementation of the device which therefore can be used for a wide range of applications. Particularly, for adapting the device to an application in different environments, it may be only required to configure the software. Revisions of the hardware are not required in such a case. For example, the sampling frequency, gain, or filter settings of the sender means may be programmed by online communication. Furthermore, it may be possible to switch online between different measurement means, e.g., between a strain gauge or a temperature sensor.

Additionally the device may comprise means for supplying energy to the sender means. For example, energy may be supplied by induced power between two coils, i.e., an air gap transformer.

Therefore, in a preferred embodiment, the means for supplying energy to the sender means includes an induction power unit outside the rotating part, an induction coil mounted around the rotating part and a corresponding energy pick-up coil mounted at the rotating part. In the sender means and/or the measurement means, a low power or power saving mode may be implemented, which can be enabled during operation by sending a corresponding control command to the sender means. This power saving mode can, for example, be used if the sender unit exceeds its design temperature or if battery supply is used.

In another preferred embodiment, the means for supplying energy to the sender means includes a battery, which is implemented in the sender means. This can enable the device to be implemented for short term use. Additionally, as battery developments nowadays bring forth batteries which can last for longer times, the usage of batteries for energy supply can be a cost-efficient alternative to the induced power supply.

To assure the functionality of the device in a harsh environment of, e.g., a gas or steam turbine rotating at a high speed for long term use, the sender means can be adapted to be functional in a harsh environment of a rotating machinery at high rotational forces up to 10,000 g. Furthermore, the sender means can also be functional at high temperatures up to about 125° C. For example, to withstand high temperatures, forces, and electromagnetic disturbances in the harsh environments of rotating machinery, the sender means may be mounted in a stable casing, e.g., made from a resilient material such as metal.

In a preferred embodiment, the sender means are mounted at the rotating part and are implemented in a Multi Chip Module (MCM-D) technology. MCM-D technology integrates the bare dies of electronic circuits and, therefore, the sender means become much smaller than an implementation on a printed circuit board. Due to the compact design and low weight of a Multi Chip Module, the sender means can withstand high centrifugal forces. The MCM-D technology is also insensitive to thermal stress because the whole design is silicon based; furthermore, a Multi Chip Module is a hermetically sealed chip for the whole design which is insensitive to oil, steam, and water.

According to one embodiment of the invention, the sender means comprises a front end unit for preprocessing measuring data received from the measurement means, an A/D converter for digitising the preprocessed measuring data, a digital signal processor for processing the digitised and preprocessed measuring data, the radio frequency module, particularly a Bluetooth® module, connected to the digital signal processor and provided for transmitting data received from the digital signal processor, and an energy supply unit connected to means for supplying energy to the sender means.

In order to eliminate or at least reduce magnetic field disturbances of the measurements caused by the rotating machinery, the front end unit may be adapted to contain a switched gauge excitation functionality in order to minimize disturbances in the measuring data. Switched gauge excitation makes it possible to minimize or even eliminate such magnetic field disturbances. Switched gauge excitation means that the polarity of the supply voltage for the gauge and the polarity of the measurement input are switched at the same time. The useful signal information will thus remain unchanged while induced magnetic field disturbances, which are independent of the polarity of the supply voltage, will be chopped up to a high frequency signal in accordance with the high switching frequency and can then be simply removed by a low pass filter.

According to a further aspect of the invention, a measurement and sender unit for performing a measurement on a rotating part of rotating machinery is provided, which comprises measurement means, adapted to be mounted at the rotating part, for measuring at least one parameter of the rotating part, and sender means, adapted to be mounted at the rotating part, for receiving measuring data from the measurement means and comprising at least one radio frequency module, particularly a Bluetooth® module, for the wireless transmission of data based on the received measuring data.

The unit may contain a Multi Chip Module (MCM-D) comprising the measurement means and the sender means. Such an embodiment is highly reliable and can withstand various disturbances, which occur in a harsh environment of rotating machinery.

The measurement means may be adapted to contain a switched gauge excitation functionality in order to minimize disturbances in the measuring data.

Furthermore, the unit can be adapted to be supplied by a powered static coil.

According to a further aspect, the invention relates to a wireless Straingauge Shaft Alignment—WSSA—apparatus, which comprises at least two shaft sections, wherein two shaft sections are coupled by a shaft coupling, and wherein each shaft section is pivoted in bearings. The WSSA apparatus comprises at least one strain gauge provided at each of both sides of a shaft coupling for measuring the strain on the shaft surface, a processing unit for processing measuring data received from the strain gauges and adapted for calculation of bending moments of a shaft coupling and bearing movements required for minimizing the residual moment in the centre of a shaft coupling, and a device according to embodiments of the invention for the measurement of coupling strain and bearing load, whereas the measurement means comprise the at least one strain gauge and the receiver means adapted to send the measurement data to the processing unit.

According to a further aspect, the invention relates to a method for performing a measurement on a rotating part of rotating machinery, wherein measurement means, which are mounted at the rotating part, measure at least one parameter of the rotating part, sender means, which comprise at least one radio frequency module, particularly a Bluetooth® module, for the wireless transmission of data based on the received measuring data, receive measuring data from the measurement means and transmit data based on the received measuring data via the at least one radio frequency module, and receiver means, which comprises a radio frequency module, particularly a Bluetooth® module, receive the data transmitted from the sender means, and a processing unit, which is connected to the receiver means, processes measuring data contained in data received from the receiver means.

Additional aspects, advantages, and features of the present invention will become apparent from the following description taken in conjunction with the accompanying drawings.

BRIEF DESCRIPTION OF THE DRAWINGS

The present invention will now be described, by way of example, with reference to the accompanying drawings, in which.

DETAILED DESCRIPTION OF EXEMPLARY EMBODIMENTS

Figure 1A:
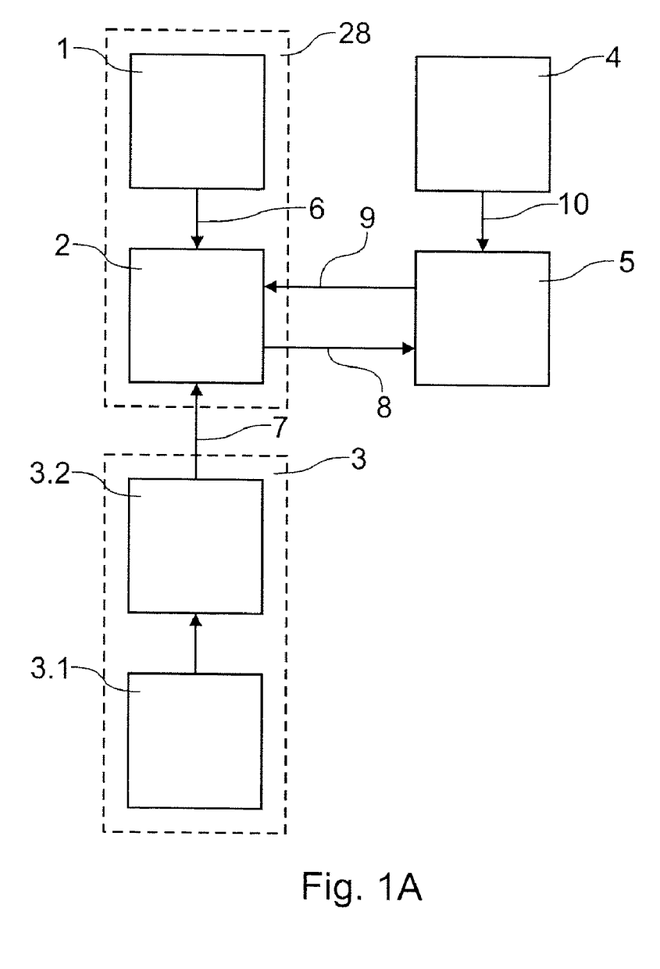
FIG. 1A shows a block diagram of a first embodiment of the device according to the invention.

FIG. 1A shows a block diagram of the device for performing a measurement of the strain of a shaft of a rotating machine such as, e.g. a gas turbine. A measurement device 1 is mounted at the shaft of the rotating machine and includes one or more strain gauges for measuring the strain on the surface of the shaft. The measurement device 1 further includes a temperature sensor for measuring the temperature at the shaft. A sender 2 of the device, which is mounted also at the shaft and includes at least one Bluetooth® module, is connected via a data connection 6 to the measurement device 1. The measurement device 1 transmits measuring data via the connection 6 to the sender 2, which sends data based on the measuring data via a wireless connection for transmission of data 8 to a receiver 5 also including a Bluetooth® module. The receiver 5 is connected via a data connection 10 to a processing unit 4 for sending the received measurement data to it. The processing unit 4 processes the received data and displays the actual temperature at the shafts as well as the strain at the shaft's surface.

Via a further wireless connection 9, the receiver 5 sends control data to the sender 2 in order to control the measurements. Particularly, the sampling frequency, gain, or filter settings of the sender are changed by the control data, in order to influence the measurements. By the control data, the device can be switched between the gauges and sensors contained in the measurement device 1.

Furthermore, a device 3, for supplying energy from the static coil 3.1 to the rotating coil 3.2 by induced power, is implemented. This is performed by supplying high frequency alternating current to the static coil 3.1. The supplied power to the static coil 3.1 is picked up by the rotating coil 3.2. The energy 7 picked up by the rotating coil 3.2 is supplied to the sender unit 28. Energy supply by induced power enables the device to be implemented for long term use. Alternatively, an energy supply with batteries in the sender 2 enables the device to be implemented for short term use.

The measurement device 1 and the sender 2 form a measurement and sender unit 28. The sender unit 28 can be implemented as a module in MCM-D technology resistant to various disturbances generated in a harsh environment of the rotating machine.

Figure 1B:
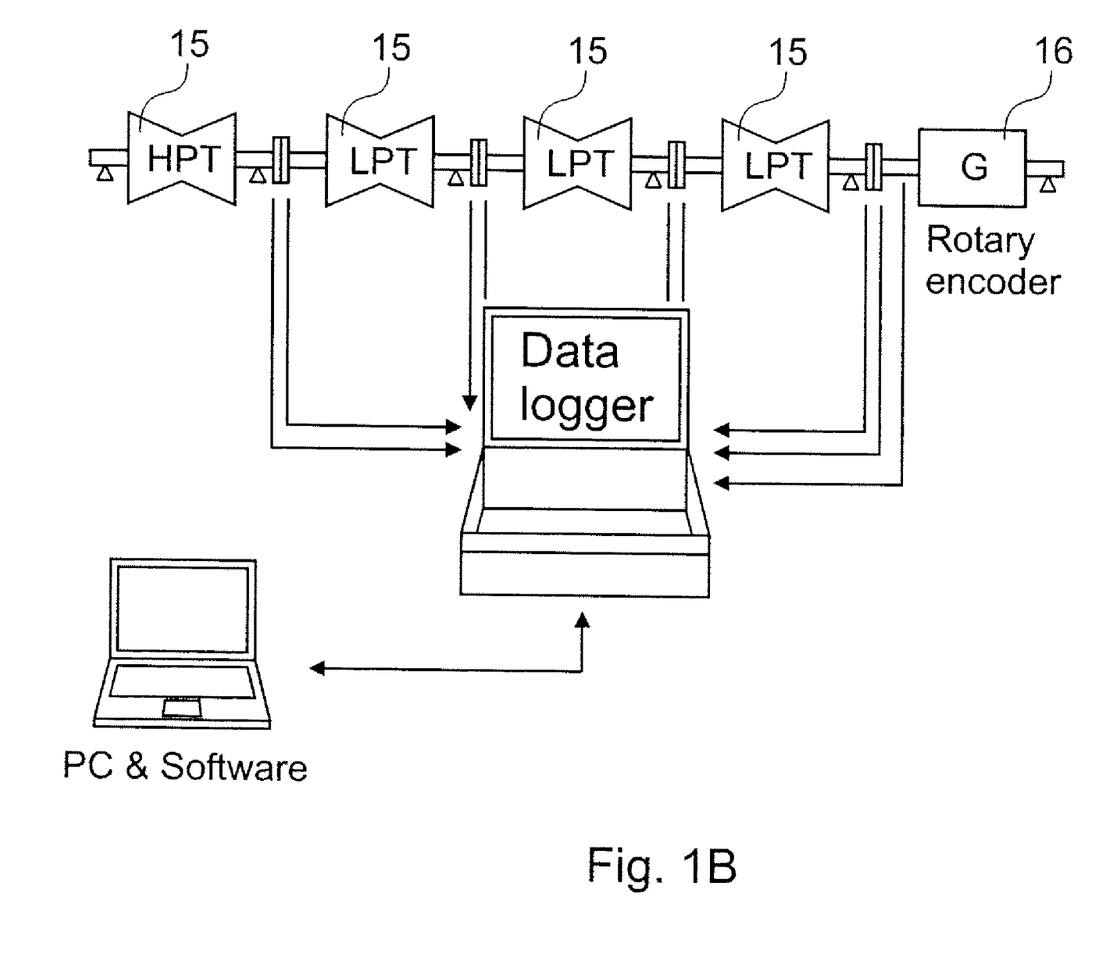
FIG. 1B shows a traditional SSA system.

FIG. 1B shows a traditional SSA system in which a data logger, connected by cables to a measurement device mounted at the shaft of a rotating machinery (here, four turbines 15 and one generator 16), is used for performing measurement. As described in the introduction, measurement with such a data logger can only be performed during an overhaul process of the rotating machinery at low rotation speeds.

Figure 2:
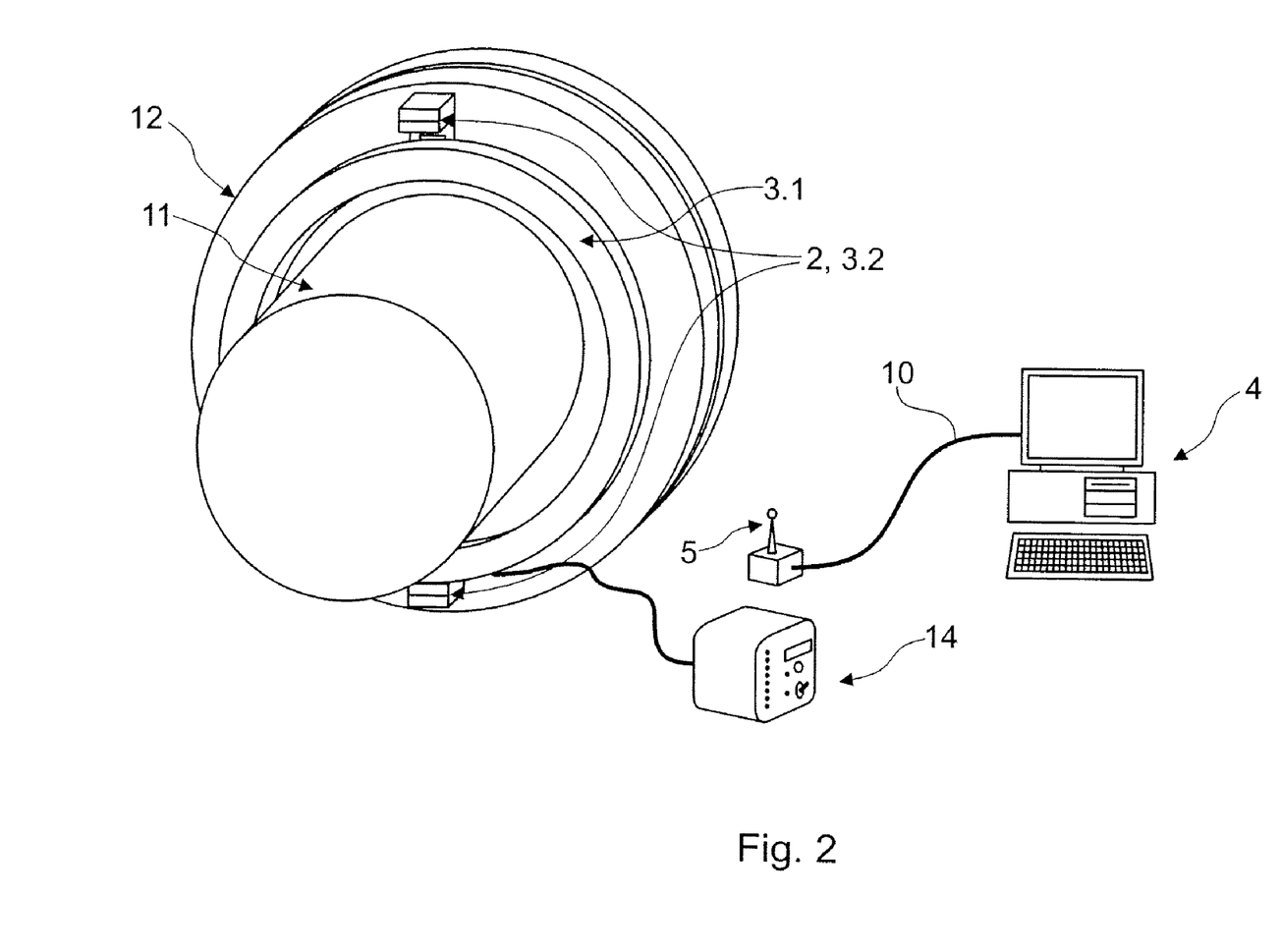
FIG. 2 illustrates a Bluetooth® based wireless SSA system for one coupling of a shaft section of a rotating machinery with two transceiver units on the rotating side and the remaining equipment on the non rotating side.

FIG. 2 shows an implementation of the device according to an embodiment of the invention. In shaft alignment systems where at least two shaft sections 11 are aligned and each shaft section 11 is connected to the next shaft section 11 by a shaft coupling, the device according to an embodiment of the invention is implemented as a device for the measurement of coupling strain and bearing load. FIG. 2 shows one shaft section 11 with a coupling flange 12 for joining with another shaft section 11. The sender 2 is mounted at the coupling flange 12.

The device for supplying energy 3 includes, in this case, an induction coil 3.1 mounted around the shaft section 11, which creates the necessary magnetic field for the inductive energy supply of the sender 2, and pick-up coils 3.2 mounted at the coupling flange 12 next to the sender 2. An induction power unit 14 provides the necessary energy to the induction coil 3.1.

The sender 2, receiving measurement data from a gauge or sensor not shown in FIG. 2, sends the measurement data via the wireless connection provided by the, e.g., Bluetooth® technology in the sender 2 and receiver 5 to the receiver. The receiver 5 sends the measurement data to the processing unit 4 via the data connection 10. Particularly for the sender 2, it is advisable to implement two Bluetooth® modules, whereas one is implemented for redundancy to take over the functionality in case the other one is not functioning.

Figure 3:
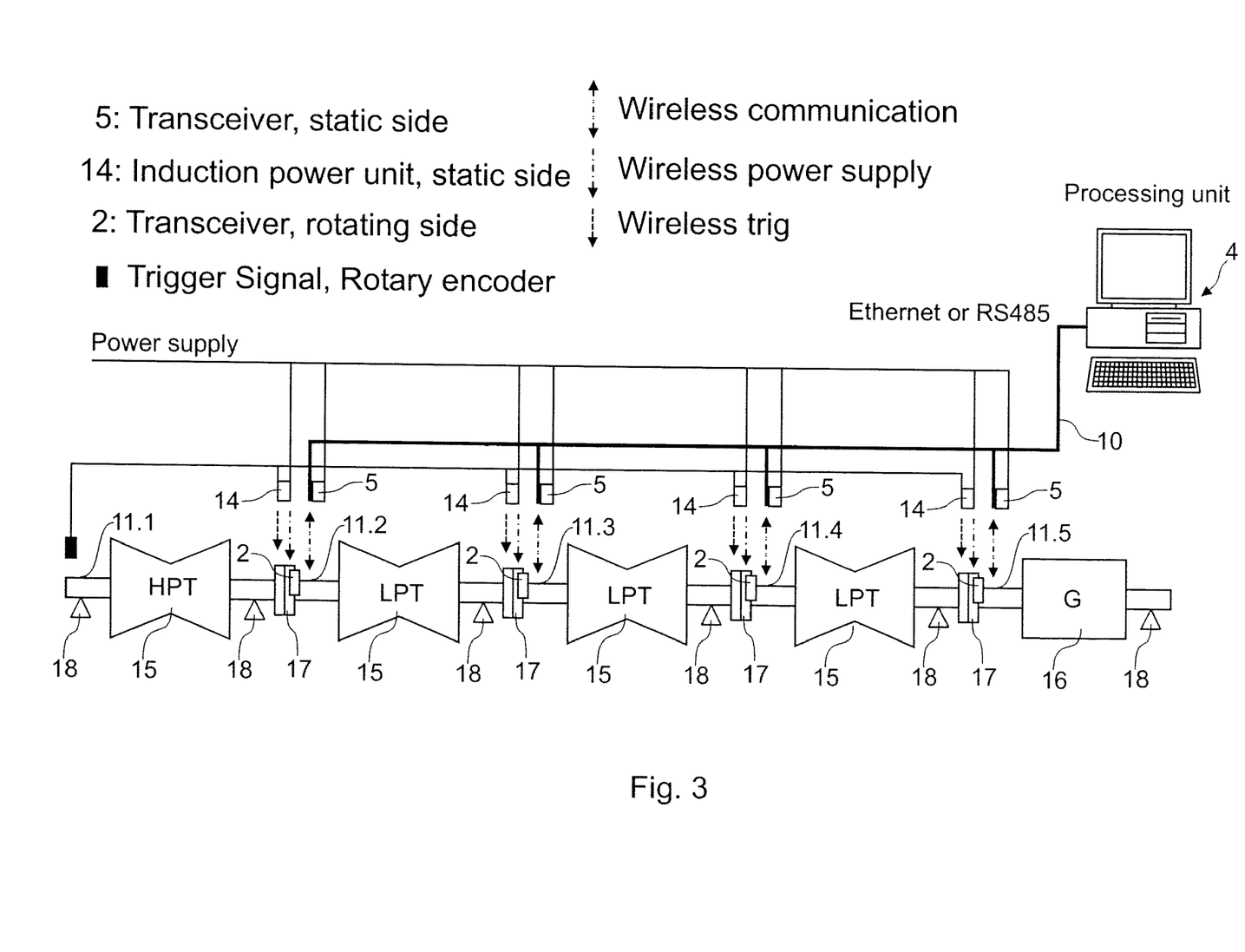
FIG. 3 shows the layout of a wireless SSA system installation.

FIG. 3 shows a wireless Straingauge Shaft Alignment (WSSA) system including a device according to an exemplary embodiment of the invention. Four turbines 15 and one generator 16 are aligned. Each shaft section 11 is coupled via shaft couplings 17 and pivoted in bearings 18 between the shaft couplings 17 and at the ends of the shaft. At least one strain gauge is mounted at both sides of each shaft coupling 17 for measuring the strain on the shaft surface at both sides of this shaft coupling 17. A sender 2 is mounted also at each shaft coupling 17 to send the measurement data of the strain gauges to the receiver 5, which are connected with the processing unit 4. The WSSA system is able to measure bearing load and coupling strain at full speed of the shown rotating machinery, without requiring cables.

The processing unit 4 processes the measurement data of the strain gauges and calculates bending moments of a shaft coupling 17 and necessary bearing movements for minimizing the residual moment in the centre of a shaft coupling 17. The data connection 10 from the receiver 5 to the processing unit 4 is designed as either an Ethernet link or a RS485 communication link.

Induction power units 14 are implemented near each shaft coupling 17 to provide the necessary energy for induction coils, which are mounted around each shaft section 11 near the shaft coupling 17 and not shown in this figure. The induction power units 14 are connected to a main power supply, not shown in this figure. They are not only designed to provide the inductive power supply but also necessary trigger signals for a digital signal processor in the sender 2. Thus a synchronisation of the measurement data with the shaft rotation can be achieved. A rotary encoder supplies the necessary trigger signals to the induction power unit 14.

The wireless connection between the sender 2 and the receiver 5 is established by the Bluetooth® modules implemented in the sender 2 and the receiver 5.

Figure 4:
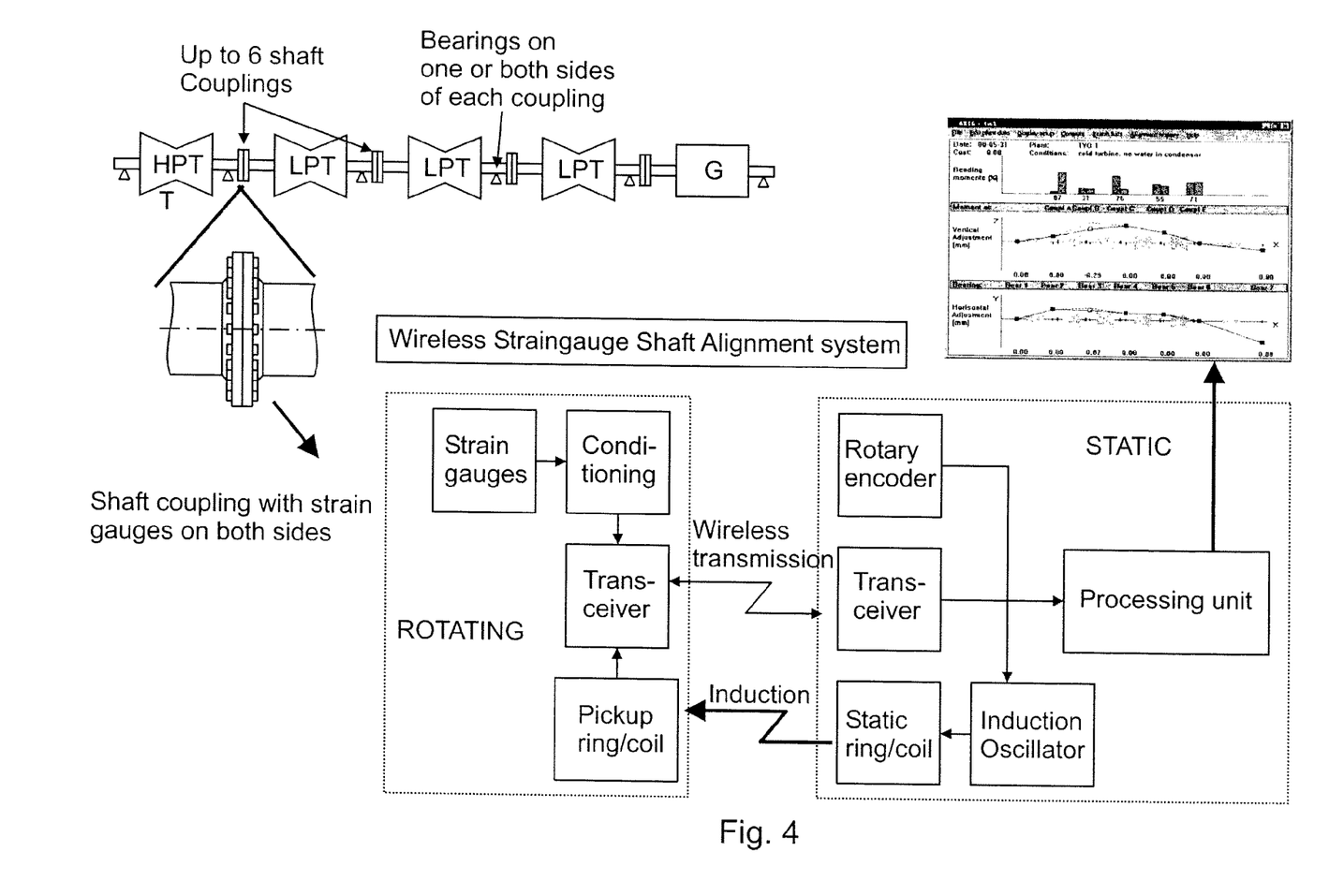
FIG. 4 shows the SSA system installation of FIG. 3 with the wireless part of the SSA systems shown in more detail and a display of a processing unit for processing the measuring data.

FIG. 4 shows the WSSA system of FIG. 3 with the measurement and sender devices shown as block diagrams in more detail. FIG. 4 shows a display of the processing unit or analysis system with the results of several measurements of the bending moments and the horizontal and vertical adjustments.

Figure 5:
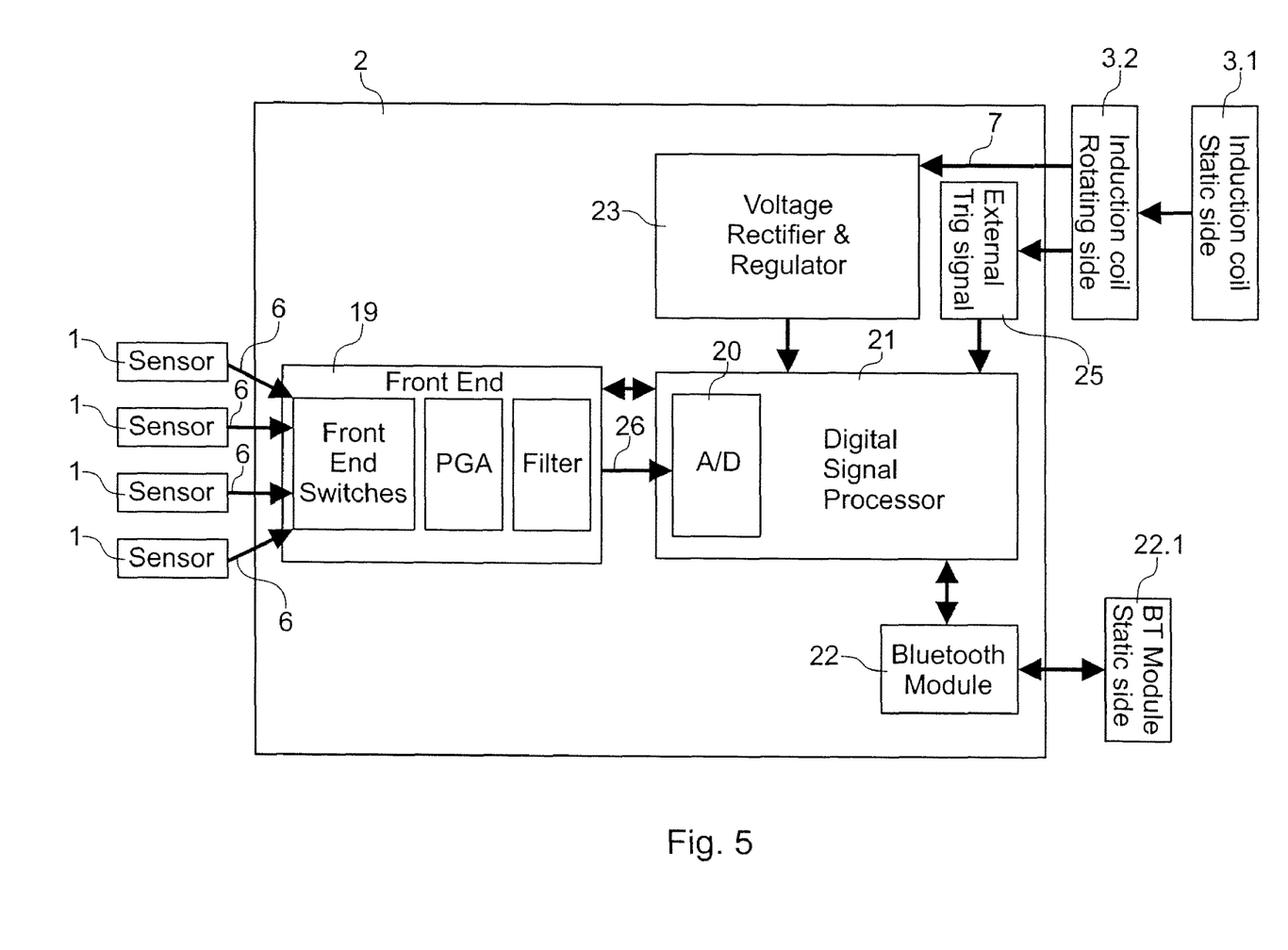
FIG. 5 shows a block diagram of a wireless Bluetooth® transceiver unit for the rotating side.

FIG. 5 shows a block diagram of the sender 2. The sender 2 includes a front end unit 19 for preprocessing the measurement data of the sensors 1. Alternatively the front end unit 19 can be implemented in the measurement device 1, i.e., together with the sensors 1. Measurement data from the sensors 1 is transmitted via the data connections 6 to the front end unit 19. The front end unit 19 includes front end switches, a Programmable Gain Amplifier (PGA), and a filter. The preprocessed measurement data is transmitted via the data connection 26 from the front end unit 19 to the A/D converter 20. After A/D conversion, the digital signal processor 21 processes the preprocessed measurement data. The digital signal processor 21 is triggered by an external trigger signal 25 provided by the pick-up coil 3.2. An energy supply unit 23 supplied with energy 7 by the induced power of the pick-up coil 3.2 provides the necessary power supply for the components of the sender 2. The pick-up coil 3.2 picks up the energy supplied to the induction coil 3.1. Finally, the Bluetooth® module 22 sends the measurement data wireless to the Bluetooth® module 22.1 of the receiver 5.

Figure 6:
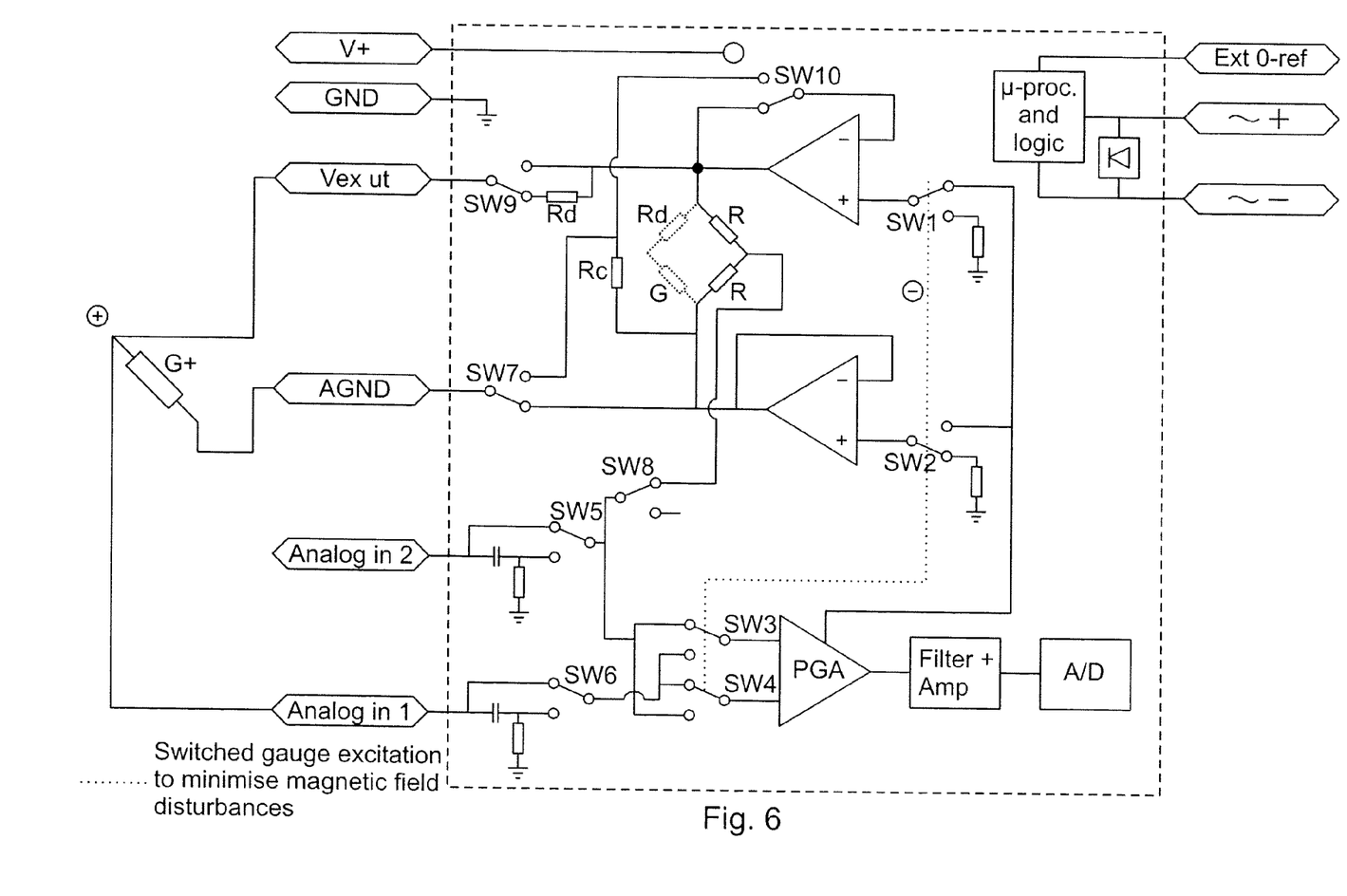
FIG. 6 shows a measurement front end including a switched gauge excitation.

FIG. 6 shows an exemplary circuit for switched gauge excitation implemented into the front end unit of the sender. To minimize or even eliminate magnetic field disturbances, the polarity of the supply voltage for the gauge and the polarity of the measurement input is switched at the same time. The useful signal information will thus remain unchanged while the induced magnetic field disturbance, which is independent of the polarity of the supply voltage, will be chopped up to a high frequency signal due to the high switching frequency and can then be removed by a low pass filter.

REFERENCE NUMERALS 1 measurement device
2 sender device
3 device for supplying energy to the sender
3.1 induction coil
3.2 pick-up coil
4 processing unit
5 receiver
6 data connection to the sender
7 inductive energy supply
8 wireless connection for transmission of measurement data
9 wireless connection for transmission of control data
10 data connection to the processing unit
11 shaft section
12 coupling flange
14 induction power unit
15 turbine
16 generator
17 shaft coupling
18 bearing
19 front end unit
20 A/D converter
21 digital signal processor
22 Bluetooth® module of the sender
22.1 Bluetooth® module of the receiver
23 energy supply unit
25 external trigger signal
26 data connection from the front end unit to the A/D converter
27 data connection from the A/D converter to the digital signal processor
28 measurement and sender unit While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A device for performing a measurement on a rotating part of rotating machinery, the device comprising:
   a measurement device, mounted at the rotating part, configured and arranged to measure at least one parameter of the rotating part;
   a sender configured and arranged to receive measuring data from the measurement device and comprising at least one radio frequency module configured and arranged to wirelessly transmit data based on the received measuring data, the sender comprising a front end unit configured and arranged to preprocess measuring data received from the measurement device, the front end unit comprising a switched gauge excitation device to minimize disturbances in the measuring data;
   a receiver comprising a radio frequency module configured and arranged to receive the data transmitted from the sender; and
   a processing unit connected to the receiver and configured and arranged to process measuring data contained in data received from the receiver.

2. The device of claim 1, wherein the receiver is additionally configured and arranged to control measurement by sending control data to the sender.

3. A device for performing a measurement on a rotating part of rotating machinery, the device comprising:
   a measurement device, mounted at the rotating part, configured and arranged to measure at least one parameter of the rotating part;
   a sender configured and arranged to receive measuring data from the measurement device and comprising at least one radio frequency module configured and arranged to wirelessly transmit data based on the received measuring data;
   a receiver comprising a radio frequency module configured and arranged to receive the data transmitted from the sender;
   a processing unit connected to the receiver and configured and arranged to process measuring data contained in data received from the receiver; and
   an energy source configured and arranged to supply energy to the sender, wherein the energy source comprises
      an induction power unit outside the rotating part;
      an induction coil mounted around the rotating part; and
      a corresponding energy pick-up coil mounted at the rotating part.

4. The device of claim 3, wherein the energy source comprises a battery in the sender.

5. The device of claim 1, wherein the sender is configured and arranged to be functional in a harsh environment of rotating machinery at rotational forces up to about 10.000 g.

6. The device of claim 1, wherein the sender is configured and arranged to be functional at temperatures up to about 125° C.

7. The device of claim 1, wherein the sender is mounted at the rotating part and comprises a Multi Chip Module.

8. The device of claim 1, wherein the sender comprises:
- an A/D converter configured and arranged to digitize the preprocessed measuring data;
- a digital signal processor configured and arranged to process the digitized and preprocessed measuring data;
- a radio frequency module, connected to the digital signal processor and configured and arranged to transmit data received from the digital signal processor;
- an energy source configured and arranged to supply energy to the sender; and
- an energy supply unit connected to the energy source.

9. A measurement and sender unit for performing a measurement on a rotating part of rotating machinery, the unit comprising:
- a measurement device, adapted to be mounted at the rotating part, configured and arranged to measure at least one parameter of the rotating part; and
- a sender, adapted to be mounted at the rotating part, configured and arranged to receive measuring data from the measurement device and comprising at least one radio frequency module configured and arranged to wirelessly transmit data based on the received measuring data;
- wherein the measurement device comprises a switched gauge excitation device to minimize disturbances in the measuring data.

10. The measurement and sender unit of claim 9, comprising a Multi Chip Module comprising the measurement device and the sender.

11. The measurement and sender unit of claim 9, further comprising:
- a power receiver configured and arranged to receive power from a powered static coil.

12. A wireless straingauge shaft alignment apparatus for usage on rotating machinery, the apparatus comprising:
- at least two shaft sections and at least one shaft coupling, wherein two of the at least two shaft sections are coupled by a shaft coupling of the at least one shaft coupling;
- bearings pivotally receiving each shaft section;
- at least one strain gauge at each of both sides of a shaft coupling, configured and arranged to measure strain on the shaft surface;
- a processing unit configured and arranged to process measuring data received from the at least one strain gauge, and adapted to calculate bending moments of a shaft coupling and bearing movements required for minimizing the residual moment in the center of a shaft coupling; and
- at least one device according to claim 1 for the measurement of coupling strain and bearing load, wherein the measurement device comprises the at least one strain gauge, and the receiver is also configured and arranged to send the measurement data to the processing unit.

13. A method for performing a measurement on a rotating part of rotating machinery, the method comprising:
- measuring with a measurement device, which measurement device is mounted at the rotating part, at least one parameter of the rotating part, the measurement device comprising a switched gauge excitation device to minimize disturbances in the measuring data;
- receiving measuring data with a sender, which sender comprises at least one radio frequency module, for the wireless transmission of data based on the received measuring data, from the measurement device;
- transmitting data with the sender based on the received measuring data via the at least one radio frequency module;
- receiving data transmitted from the sender with a receiver, which receiver comprises a radio frequency module; and
- processing measuring data contained in data received from the receiver with a processing unit, which is connected to the receiver.

* * * * *